J. W. SMITH.
ANIMAL TRAP.
APPLICATION FILED JULY 6, 1920.
1,357,530.
Patented Nov. 2, 1920.
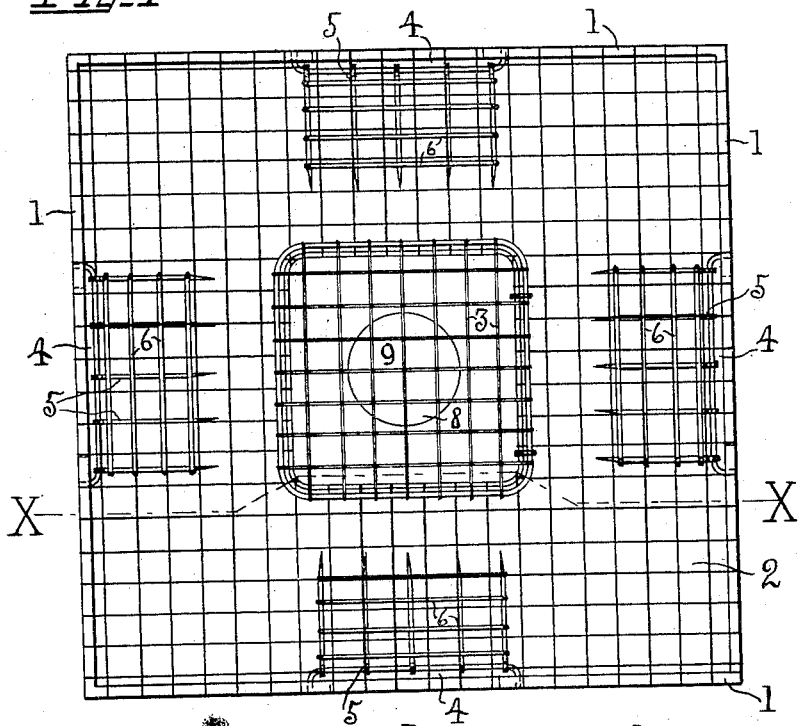
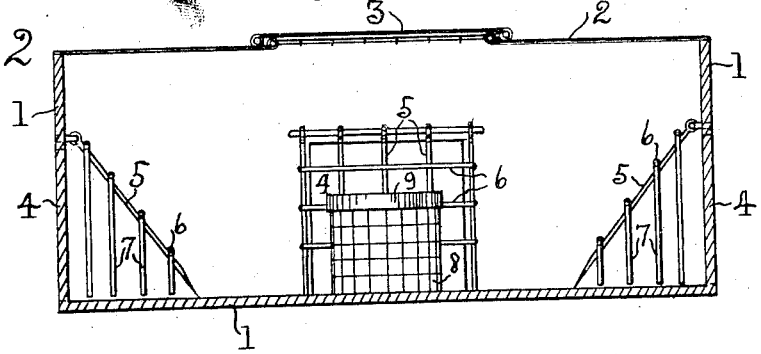
Inventor.
James W. Smith.

UNITED STATES PATENT OFFICE.

JAMES W. SMITH, OF SHERMAN, TEXAS.

ANIMAL-TRAP.

1,357,530.  Specification of Letters Patent.  Patented Nov. 2, 1920.

Application filed July 6, 1920. Serial No. 394,197.

*To all whom it may concern:*

Be it known that I, JAMES W. SMITH, a citizen of the United States, residing at Sherman, in the county of Grayson and State of Texas, have invented certain new and useful Improvements in Animal-Traps, of which the following is a specification.

My invention relates to animal traps, and particularly to traps of this character having a body portion or cage into which the animal passes, and provided with means for preventing the return of the animal when once within.

The main object of this invention is to provide a trap of this character which, by changing the size and the entrances used is adaptable for catching mice, rats and other animals of the rodent species.

Minor objects consist in providing means whereby the animal when once within the trap is prevented from opening the gate which has closed behind him; also in providing means whereby the bait used, while open to view, cannot be destroyed; and again in providing means whereby the bait shall be so positioned as to excite the curiosity of the animals and attract them to the trap, and finally in details of construction and arrangement of the several parts set forth in the specification and more particularly stated in the claim appended.

In the accompanying drawings forming a part of this specification, and in which like characters of reference indicate corresponding parts, Figure 1 is a plan view, and Fig. 2 is a sectional elevation taken on the line X—X of Fig. 1.

Referring to the drawings, 1 indicates a box, rectangular in form; the bottom and sides being preferably constructed of sheet metal, and the top 2 of foraminous material and provided with a central opening that is closed by a hinged door 3 secured thereto in any suitable manner. Centrally located in each side of the box and extending to the bottom thereof, is provided an entrance-opening 4.

Pivotally hung above each ingress opening and inside the box is an inclined wire gate 5 normally closing the said openings, the free end of the gate resting upon the bottom of the trap. The lower ends of the wires of the gates 5 are made pointed so as to prick the animal should he attempt to escape. The wires 5 are more securely held in assembled relation by being soldered to transverse bars 6, which bars have their ends bent downwardly at right angles as indicated by 7, to close the sides of the entrance-openings.

Centrally secured to the bottom of the box 1 and in front of the entrance-openings 4, is a receptacle 8 for containing food or bait to entice the animals into the trap, it is vertically cylindrical in form and preferably of wire gauze, also provided with a removable cover 9.

From the foregoing description it will be understood that the animal readily enters the trap at either of the four sides by raising a pivotally hung gate, which closes behind it.

Although the elements herein set forth are fully adapted to serve the intended purposes, it is understood that various changes in the form, proportion and minor details of construction may be resorted to without departing from the spirit of the invention.

Having thus fully described my invention what I esteem as new and desire to secure by Letters Patent, is—

In an animal trap the combination of a rectangular box provided with an entrance-opening in each of its four sides, a gate formed of downwardly inclined wires pivoted above each of said openings inside of the box, and the sides of the gates closed by downwardly bent ends of transverse bars secured to the said inclined wires.

In testimony whereof I affix my signature.

JAMES W. SMITH.